US005352473A

United States Patent [19]
Chiqurupati et al.

[11] Patent Number: 5,352,473
[45] Date of Patent: Oct. 4, 1994

[54] METHOD FOR INCREASING STABILITY AND BAKE ABSORPTION OF A BREAD BAKING WHEAT FLOUR AND RESULTING DOUGH

[75] Inventors: Sambasiva R. Chiqurupati; James Pulverenti, both of Omaha, Nebr.

[73] Assignee: ConAgra, Inc., Omaha, Nebr.

[21] Appl. No.: 192,308

[22] Filed: Feb. 4, 1994

Related U.S. Application Data

[63] Continuation of Ser. No. 868,012, Apr. 13, 1992, abandoned, Continuation-in-part of Ser. No. 819,886, Jan. 13, 1992, abandoned.

[51] Int. Cl.⁵ .................................................. A23L 1/10
[52] U.S. Cl. .................................. 426/549; 426/520; 426/521
[58] Field of Search ........................ 426/549, 520, 521

[56] References Cited

U.S. PATENT DOCUMENTS

| | | |
|---|---|---|
| 2,525,599 | 10/1950 | Gustavson . |
| 3,159,495 | 12/1964 | Japikse . |
| 3,368,904 | 2/1968 | Young et al. . |
| 3,428,461 | 2/1969 | Hatton et al. . |
| 3,490,917 | 1/1970 | Doe . |
| 3,554,772 | 1/1971 | Haukinson . |
| 3,585,049 | 6/1971 | Galle . |
| 3,869,558 | 3/1975 | Hampton . |
| 3,974,298 | 8/1976 | Cauvain . |
| 3,976,807 | 3/1974 | Whelan . |
| 4,157,406 | 6/1979 | Hanamoto et al. . |
| 4,259,362 | 3/1981 | Hanamoto et al. . |
| 4,937,087 | 6/1990 | Bush . |

FOREIGN PATENT DOCUMENTS

| | | |
|---|---|---|
| 0188318 | 7/1986 | European Pat. Off. . |
| 2110065 | 5/1972 | France . |
| 101548 | 9/1978 | Japan . |
| 116657 | 5/1988 | Japan . |
| 6701205 | 7/1968 | Netherlands . |
| WO91/11911 | 8/1991 | PCT Int'l Appl. . |
| 180496 | 6/1922 | United Kingdom . |
| 228829 | 12/1924 | United Kingdom . |
| 228830 | 1/1925 | United Kingdom . |
| 228841 | 1/1925 | United Kingdom . |
| 263897 | 12/1926 | United Kingdom . |
| 300291 | 11/1928 | United Kingdom . |
| 300537 | 11/1928 | United Kingdom . |
| 300568 | 11/1928 | United Kingdom . |
| 310125 | 4/1929 | United Kingdom . |
| 543720 | 3/1942 | United Kingdom . |
| 1085562 | 5/1964 | United Kingdom . |
| 1499986 | 2/1978 | United Kingdom . |

OTHER PUBLICATIONS

Modern Cereal Chemistry (Sixth Edition) by D. W. Kent-Jones and A. J. Amos, Food Trade Press 1967, pp. 175–178.

Cereal Chemistry-A Study of Some Methods of Examining Flour, With Special Reference to the Effects of Heat-I. Effects of Heat on Flour Proteins, by C. W. Herd, *Cereal Chemistry,* vol. VIII, Jan., 1931, No. 1., pp. 1–23.

A Study of some Methods of Examining Flour, With Special Reference to the Effects of Heat-II. Effects of Heat on Flour Enzymes, by C. W. Herd, *Cereal Chemistry,* vol. VIII, Mar. 1931, pp. 145–161.

Chemical and Physico-Chemical Changes Induced in Wheat and Wheat Products by Elevated Temperatures, by W. F. Geddes, *Can J. Res.,* I, pp. 528–559.

Chemical and Physico-Chemical Changes Induced in Wheat and Wheat Products by Elevated Tem- (List continued on next page.)

*Primary Examiner*—Carolyn Paden
*Attorney, Agent, or Firm*—Willian Brinks Hofer Gilson & Lione

[57] ABSTRACT

Wheat flour is heat treated by suspending it in a heated carrier gas having an outlet temperature of 70°–145° C. for 5–8 seconds to increase farinograph stability and net bake absorption of the flour. Bread dough made with the heat treated flour exhibits increased refrigerated shelf life and reduced amylase activity.

22 Claims, 3 Drawing Sheets

OTHER PUBLICATIONS peratures-II, by W. F. Geddes, *Can J. Res.*, II, pp. 65-90.

Chemical and Physico-Chemical Changes in Wheat and Wheat Products Induced by Elevated Temperatures-III. The Influence of Germ Constituents on Baking Quality and Their Relation to Improvement in Flour Induced by Heat and Chemical Improvers, by W. F. Geddes, *Can J. Res.*, II, pp. 195-213.

Flour Drying Flowsheet, Drawing 761-9010-2000, Oct. 23, 1990.

Abstract of Japanese Patent Document 63014650.

Abstract of U.S. Patent 4,904,493.

Abstract of Japanese Patent Document 62166831.

Fig. 1

Fig. 2
CONTROL 2
STABILITY = 13 MIN.

Fig. 3
EX 5
STABILITY = 29.5 MIN.

Fig. 4
CONTROL 4
STABILITY = 4 MIN.

Fig. 5
EX 10
STABILITY = 11 MIN.

Fig. 6

METHOD FOR INCREASING STABILITY AND BAKE ABSORPTION OF A BREAD BAKING WHEAT FLOUR AND RESULTING DOUGH

CROSS REFERENCE TO RELATED APPLICATION

This application is a continuation of Ser. No. 07/868,012, filed Apr. 13, 1992, now abandoned, which is a continuation-in-part of Ser. No. 07/819,886, filed Jan. 13, 1992, now abandoned.

BACKGROUND OF THE INVENTION

This invention relates to a method for heat treating a bread baking wheat flour to form a flour and the resulting dough having improved stability and bake absorption.

Various approaches have been proposed in the prior art for heat treating wheat flour in order to alter its characteristics. For example, Hankinson U.S. Pat. No. 3,554,772 discloses a heat treatment method designed to inactivate a substantial portion of the enzymes of the flour. In this method flour is heated in an aqueous suspension to about 135° to 150° F. in the presence of a hydration prevention agent, and the heated suspension is then sprayed dried, preferably to a moisture content below about 10 percent. The resulting heat treated flour is said to provide a dough with a longer shelf life caused by the reduced enzyme activity. A heating approach which requires the flour to be first mixed with water and then sprayed dried is a relatively cumbersome, energy intensive process. Furthermore, there is no suggestion in the Hankinson patent that heat treating parameters may be selected to increase dough strength and bake absorption of the dough formed from the heat treated flour.

Hampton U.S. Pat. No. 3,869,558 discloses a method for making a free-flowing cereal flour with a moisture content between about 4 and about 10 percent and a high and stable viscosity. The flour is made by subjecting a cereal flour with a normal native moisture content to indirect heating at a temperature of 120° to 160° C. for 5 to 60 minutes. The flour being treated is maintained under a protective blanket of water vapor derived from the vaporization of the native moisture of the flour starting material. The disclosed method is said to degrade alpha amylase present in the flour to produce a product with a high Falling Number and a high water binding capacity. There is no suggestion in the Hampton patent that a heat treatment process may be designed to produce an improved dough having increased stability and increased bake absorption.

Dough strength or stability is a measure of a flour's tolerance to mixing, and it is related to the gluten properties of the flour. Higher stability flours often command a higher price, and it would be therefore desirable if it were possible to enhance the dough strength of a flour.

SUMMARY OF THE INVENTION

It is a primary object of this invention to provide a flour or bread dough with increased farinograph stability. It is another object to provide a flour or bread dough with increased bake absorption. It is another object to provide a flour or bread dough with the aforementioned properties along with decreased enzyme activity. It is another object of this invention to provide a bread dough with increased refrigerated and/or frozen shelf life.

According to a first aspect of this invention, a method is provided for increasing stability of bread baking wheat flour by suspending the flour in a heated carrier gas having an outlet temperature in the range of about 70° to 145° C. for a time sufficient to reduce moisture content of the flour by at least 5 weight percent and to increase farinograph stability of the flour by at least 10 percent, and then separating the flour from the carrier gas to provide a free-flowing dry powder having a reduced moisture content and an increased farinograph stability as compared with the initial flour. The heat treated flour can be mixed with dough forming ingredients including water to form an increased stability dough.

According to a second aspect of this invention, a method is provided for increasing the net bake absorption of bread baking wheat flour by suspending the flour in a heated carrier gas having an outlet temperature in the range of about 70° to 145° C. for a time sufficient to reduce moisture content of the flour by at least 5 weight percent and to increase net bake absorption of the flour by at least 2 lbs. of water per 100 lbs. flour. The flour is then separated from the carrier gas to provide a free-flowing dry powder having a reduced moisture content and an increased net bake absorption as compared with the initial flour. This heat treated flour can be mixed with dough forming ingredients including water to form an increased net bake absorption bread dough.

As described in detail below, the preferred embodiments of this invention provide a heat treated bread baking wheat flour with an increased stability, an increased water absorption along with a reduced enzyme activity as compared with the original flour. This invention is particularly useful in increasing gluten strength of relatively low stability flours. The heat treated flour described below has an increased shelf stability and a reduced moisture content. The reduced moisture content of the flour reduces shipping costs associated with flour transport and the increased stability of the flour reduces the amount of vital gluten that must be added in applications such as high fiber breads. The higher net bake absorption of the flour reduces the amount of flour needed to make a standard loaf.

DETAILED DESCRIPTION OF THE PRESENTLY PREFERRED EMBODIMENTS

The following paragraphs define standard terms used in this specification and the following claims, and then provide a description of the presently preferred embodiments of this invention and a number of specific examples.

Definitions

Bread dough—A dough for making bread, including breads such as white, whole wheat and other breads and related products such as pizza crust, whether frozen, refrigerated at temperatures above freezing, or unrefrigerated.

Bread baking flour—A flour suitable for baking bread, including bread such as white, whole wheat and other breads and related products such as pizza crust.

Refrigerated dough—A dough which is stored at a reduced temperature to enhance shelf life, including reduced temperatures above and below freezing.

Wheat flour—A flour milled from any wheat, including hard, soft and durum wheats.

Moisture content—Moisture content of a flour as measured by the air-oven method set out in AACC method 44–16 (revised 10/27/82).

Ash content—Ash content of a flour as measured by the basic method set out in AACC method 08$\propto$01 (revised 10/28/81).

Protein content—Protein content of a flour as measured by the improved Kjeldahl method set out in AACC Method 46–10 (revised 9/25/85).

Farinograph stability—Dough strength as measured by the farinograph method set out in AACC Method 54–21 (reviewed 10/27/82). Stability is a measure of a flour's tolerance to mixing, and it is further discussed in the Farinograph Handbook, Burt L. D'Appolonia and Wallace H. Kunerth, Editors (Third Edition, 1984, American Association of Cereal Chemists, St. Paul, Minn.).

Falling Number—Alpha amylase activity as measured by the method set out in AACC Method 56–81B (revised 10/12/88).

Bake absorption—A measure of the amount of water that can be added to a flour to form a dough having good sheeting properties (expressed in weight percent of water per unit weight of flour) as set out in AACC Method 10–11 (revised 10/27/82).

Net bake absorption—Bake absorption as defined above minus the amount of water required to raise the moisture content of a flour to a standard moisture content. The net bake absorption can be used to compare water binding properties of flours having differing initial moisture contents.

General Discussion

This invention is based on the discovery that by properly selecting heating conditions and time parameters the stability and net bake absorption of a flour can be increased by a dry heating process. The dry heating process described below utilizes short times and carefully controlled temperatures such that enzymes such as alpha amylase are partially or substantially inactivated, while gluten strength and bake absorption are actually increased.

Figure 1:
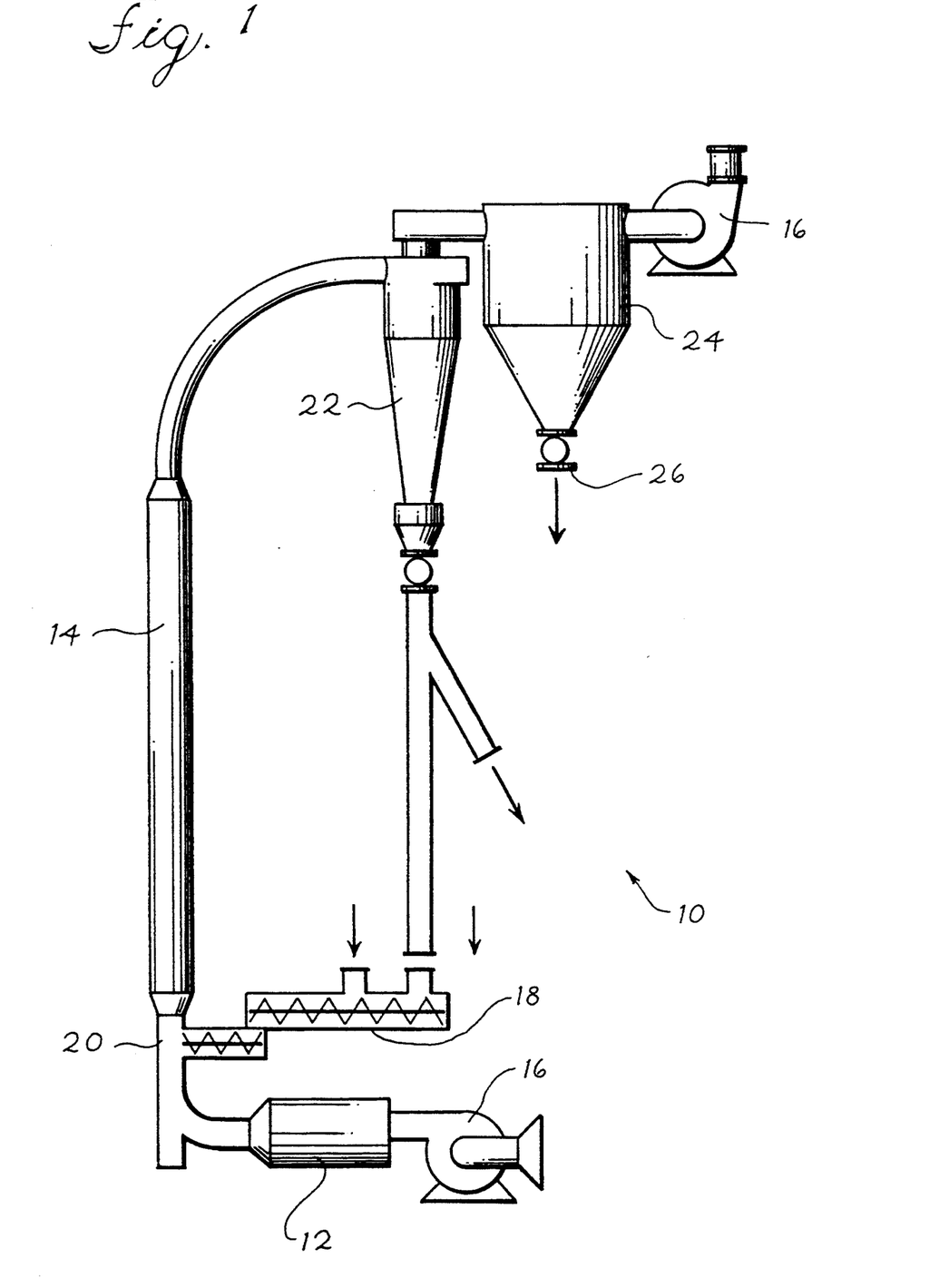
FIG. 1 is a block diagram of a drying apparatus suitable for use with the preferred embodiment of the method of this invention.

In the preferred embodiment of this invention a bread baking wheat flour is treated with a drying apparatus as shown in the attached figure. This drying apparatus 10 includes a heat exchanger 12 which is connected to a dryer column 14. Fans 16 force a carrier gas such as air or other oxygen containing gas through the dryer column 14. Any appropriate heat source can be used to heat the carrier gas as it passes through the heat exchanger 12, including gas fired heaters and steam heaters. The heat exchanger 12 can also operate with electric heating or can utilize heated waste gases from other processes.

The dryer column 14 is designed to fit the particular application, having a diameter determined in the conventional manner by factors such as the evaporative duty, the drying temperature and the velocity required to convey the material. The length of the column is determined by conventional factors to provide the required residence time. Depending upon the application the dryer column 14 can be shaped and sized to fit within an existing building or to provide the finished product at a required position. Preferably, the fans 16 include conventional control dampers (not shown) to set the air volume and pressure balance at the feed point. When the overall system pressure drop is not high a simple single fan system can be employed. A feeder 18 feeds the incoming flour into the dryer column 14 at a feed point 20. A variety of feeders can be used including vibrating, paddle, or pneumatic type feeders. Hoppers with appropriate discharging facilities can be provided for continuous metering from batch chargers. Conventionally, high air velocities are employed at the feed point 20 to assist in product entrainment and dispersion. Lower velocities are preferably used in the subsequent dryer column 14 to achieve an increased residence time.

The feeder 18 introduces flour into the dryer column 14, and the flour is carried by the moving heated air to a recycle separator 22. If desired, the flour passing out the bottom of the recycle separator 22 can be reintroduced into the feeder 18 to repeat the drying process. Generally this is not done and the entrained flour is separated from the carrier gas by a main separator 24. This treated powder is a free-flowing dry product which is available at the discharge point 26 for collection or bagging. If desired, the treated flour may be cooled at the discharge point 26 to ambient temperature prior to collection or bagging.

A suitable drying apparatus 10 can be obtained from APV Pasilac Limited of Carlisle, Cumbria, United Kingdom identified as a TV drying system. In the following examples, such a system was arranged to maintain the flour in the heated air for a residence time of 5 to 8 seconds, and to provide an inlet air temperature measured upstream of the feedpoint 20 in the range of 150°–255° C. and an outlet or exhaust air temperature measured upstream of the recycle separator 22 in the range of 70°–145° C. As discussed below, these conditions have been found to provide a flour with surprisingly increased farinograph stability and net bake absorption. The exhaust air temperature is preferably 70°–145° C., more preferably 80°–120° C., and most preferably 90°–110° C.

Farinograph stability is a well known measure of dough strength, which involves forming a dough by mixing flour and water, and then graphing the resistance of the dough to mixing as a function of elapsed time. Conditions are standardized so that maximum resistance is centered at a level equal to 500 Brabender Units (BU), and the elapsed time is measured between the point where the top of the curve first reaches the 500 BU line (arrival time) and the point where the top of the curve leaves the 500 BU line (departure time). This elapsed time is the farinograph stability. In general, the greater the farinograph stability, the greater the strength of the dough and the greater its suitability for bread baking.

Figure 2:
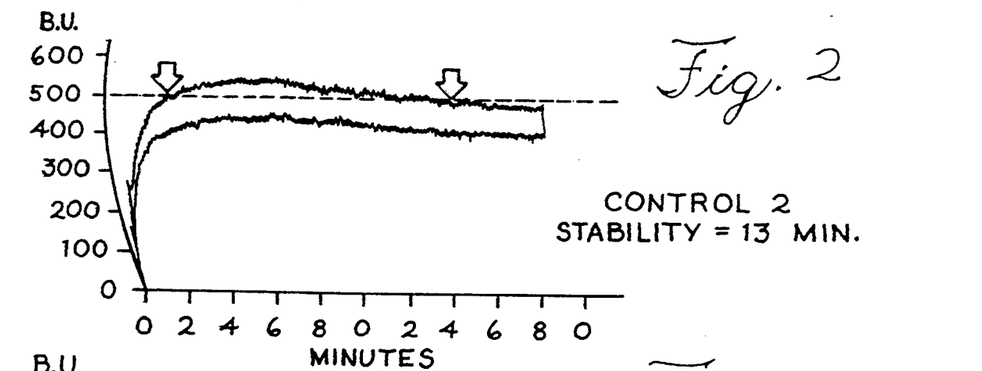
FIGS. 2 and 3 are farinograms for Control 2 and Example 5 of Table 2, respectively.
Figure 3:
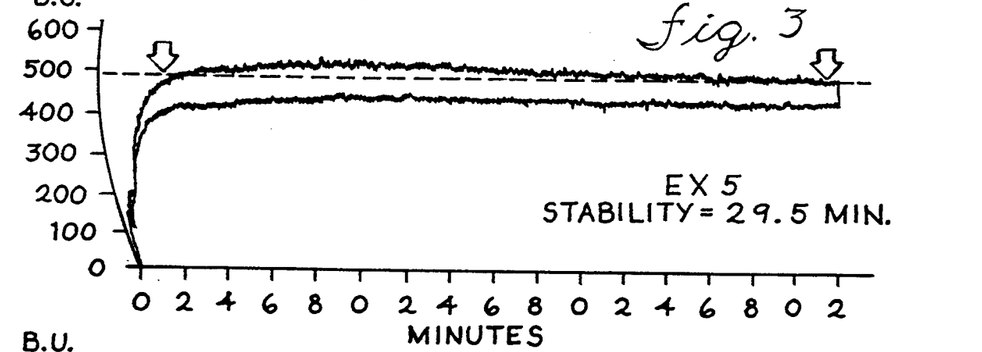
Figure 4:
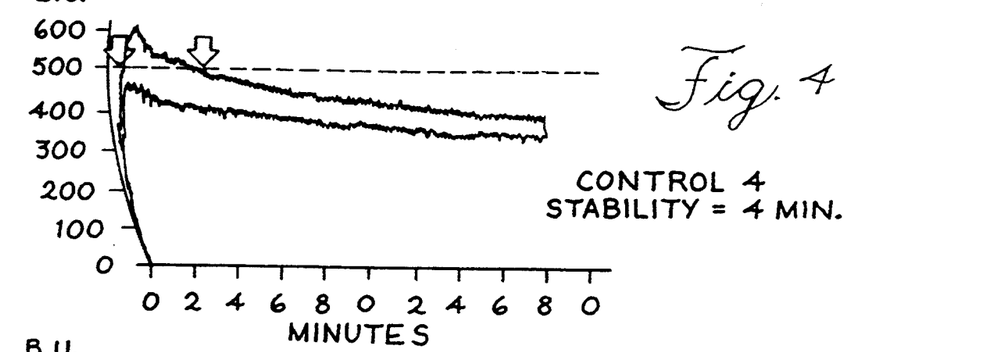
FIGS. 4 and 5 are farinograms for Control 4 and Example 10 of Table 4, respectively.
Figure 5:
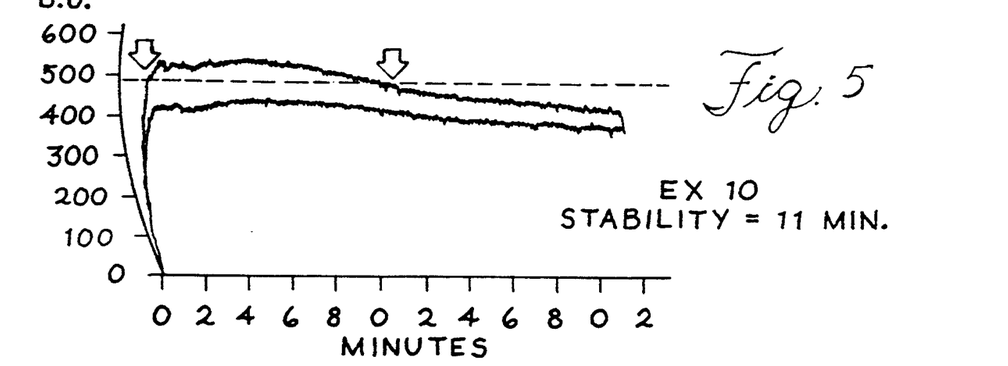

FIGS. 2–5 illustrate farinograms for two controls and two examples discussed below. FIGS. 2 and 3 are copies of the farinograms for Control 2 and Example 5 of Table 2, respectively; FIGS. 4 and 5 are copies of farinograms for Control 4 and Example 10 of Table 4, respectively. In each case the arrival and departure times are marked with vertical arrows, and the farinograph stability is listed. Note the different curve shape and the increased stability of the examples (FIGS. 3 and 5) as compared with the respective controls (FIGS. 2 and 4).

In general, the flour starts with a moisture content in the range of 11 to 16 wt %, and moisture content is reduced by at least 5 wt % in the drying apparatus 10, often to a value of less than 7 wt %. The flour is heated in the carrier gas preferably for a time of less than one minute, more preferably for a time of less than 30 seconds, and most preferably for a time of less than 10 seconds (such as 5-8 seconds).

Stability Tests

In the following Examples 1–21, flour was heat treated in a dryer as described above at various inlet temperatures and at various outlet or exhaust temperatures. In general, the inlet temperature was controlled by adjusting the amount of heat supplied by the heat exchanger 12 within the range of 128° C. to 255° C. The exhaust or outlet temperature was measured with a thermocouple upstream of but near the recycle separator 22 and was adjusted for various values between 70° C. and 175° C. by controlling the product feed rate to maintain the desired exhaust temperature. Air was used as the carrier gas, though other gases such as $N_2$ and $O_2$ are believed suitable. The flour was subjected to elevated temperatures in the dryer column 14 for approximately 5 to 8 seconds, and the temperature of the heat treated flour as measured with a thermometer at the discharge point 26 was about 10° C. less than the outlet temperature. Two different heat sources were used, including natural gas and steam. In both cases, the heat source was separated from the flour from by the heat exchanger 12. Flour was heat treated at the rate of 100 pounds per hour.

It is known that storing a flour over a long period at low or room temperature will increase the farinograph stability of the flour to a limited extent. This effect was taken into account in the following examples by starting with examples and controls from the same batch of flour and performing the farinograph tests on the same day for both the heat treated flours and the respective control flours.

EXAMPLES 1–3 (TABLE 1)

A high gluten 100 percent spring wheat flour identified under the tradename Kyrol and produced in the Hastings, Minn. mill of ConAgra, Inc. was divided into four samples. The control sample was untreated, and was analyzed as described in Table 1 at the same time as the treated flours of Examples 1, 2 and 3. The flours of Examples 1, 2 and 3 are treated with an inlet temperature of 150° C. and an exhaust temperature as stated at the top of Table 1. In this case, the heat exchanger 12 was heated by a natural gas flame. The flour was substantially unmodified and was not bleached, enriched or treated with enzymes or bromate.

TABLE 1

| Inlet/Outlet Temp (°C.) | SAMPLE | | | |
|---|---|---|---|---|
| | CONTROL 1 NA | EX. 1 150°/70° | EX. 2 150°/80° | EX. 3 150°/90° |
| Moisture (wt %) | 13.7 | 6.3 | 5.6 | 4.5 |
| Ash (wt %)* | .53 | .53 | .52 | .52 |
| Protein (wt %)* | 13.7 | 13.7 | 13.6 | 13.7 |
| Falling Number (seconds)* | 426 | — | — | 517 |

TABLE 1-continued

| Inlet/Outlet Temp (°C.) | SAMPLE | | | |
|---|---|---|---|---|
| | CONTROL 1 NA | EX. 1 150°/70° | EX. 2 150°/80° | EX. 3 150°/90° |
| Farinograph | | | | |
| Stability (minutes) | 15.2 | 16.5 | 16.0 | 23.0 |
| Absorption (wt %)* | 64.0 | 60.4 | 61.5 | 61.2 |
| Peak Time (minutes) | 9.0 | 8.0 | 10.0 | 10.5 |
| Mixing Tolerance (B.U.) | 15.0 | 25.0 | 25.0 | 15.0 |

*Adjusted to 14% moisture basis

Table 1 lists the measured moisture, ash and protein content of the flours. The moisture content was substantially reduced for the treated flour of Examples 1, 2 and 3, and for this reason the ash, protein and Falling Number measurements have been normalized for flour at a 14 percent moisture basis in these and all subsequent examples. Note that the ash and protein contents have not varied, but that the Falling Number has increased, due to inactivation of alpha amylase.

Table 1 also shows the results of farinograph measurements on the control flour and the flour of Examples 1 through 3. As pointed out above, farinograph stability is an indication of the strength of the dough and its resistance to damage by mixing. Note that the farinograph stability of the flours of Examples 1, 2 and 3 is increased as compared to the control. As shown in Table 1, the alpha amylase activity of the flour of Exhibit 3 was found to be substantially lower than the alpha amylase activity of the control flour.

Table 1 confirms that the heat treatment process described above increases the gluten strength of the treated flour as compared to the control flour. It should be noted that Examples 1 through 3 (and all the remaining examples described below) tested positive for peroxidase. In view of the reduced alpha amylase activity, it appears that the heat treatment described above heats the flour to a point where alpha amylase is inactivated, but not the point where peroxidase is inactivated.

EXAMPLES 4–6 (TABLE 2)

For Examples 4 through 6 a hard red spring wheat similar but not identical to that described above was divided into four samples. The control was not heat treated and the remaining three samples were treated as defined in Table 2 (Examples 4 through 6). A natural gas heater was used for Examples 4 and 5, and a steam heater was used for Example 6. As before the ash and protein content (when normalized for a 14 percent flour moisture content) were unchanged, while the moisture content of the treated flour was substantially reduced. The Falling Number of the treated flours was increased as compared to the control. Again, farinograph stability measurements showed that the treated flour of Examples 4, 5 and 6 exhibited increased dough stability as compared with the control flour.

TABLE 2

| Inlet/Outlet Temp (°C.) | SAMPLE | | | |
|---|---|---|---|---|
| | CONTROL 2 NA | EX. 4 150°/90° | EX. 5 165°/110° | EX. 6 128°/90° |
| Moisture (wt %) | 13.5 | 4.8 | 3.4 | 4.5 |
| Ash (wt %)* | .557 | .563 | .558 | .576 |
| Protein (wt %)* | 13.4 | 13.5 | 13.4 | 13.3 |
| Falling Number (seconds)* | 427 | 566 | 705 | 601 |

TABLE 2-continued

| Inlet/Outlet Temp. (°C.) | SAMPLE | | | |
|---|---|---|---|---|
| | CONTROL 2 NA | EX. 4 150°/90° | EX. 5 165°/110° | EX. 6 128°/90° |
| Farinograph | | | | |
| Stability (minutes) | 13.0 | 19.5 | 29.5 | 17.0 |
| Absorption (wt %)* | 64.4 | 64.3 | 64.4 | 64.2 |
| Peak Time (minutes) | 7.0 | 9.5 | 12.5 | 9.5 |
| Mixing Tolerance B.U. | 25.0 | 20.0 | 20.0 | 20.0 |

*Adjusted to 14% moisture basis.

Additionally, pH measurements showed that the pH of the treated flour was not significantly different from that of the control flour, and particle size measurements indicated that the particle size distribution of the treated flour was not significantly different from that of the control flour.

EXAMPLES 7-9 (TABLE 3)

For Examples 7 through 9 a sample of pastry flour (100 percent soft wheat) obtained from the Alton, Ill. mill of ConAgra, Inc. was divided into four samples. This flour was not bleached, enriched or supplemented with bromate or malt. The control sample was not heat treated, but it was analyzed at the same time as Examples 7, 8 and 9. These samples were heat treated at the indicated inlet/outlet temperatures using natural gas as a heat source. As before the moisture content was substantially reduced, and the ash and protein content when calculated at a moisture basis of 14 percent were substantially unchanged. As before, the Falling Number increased indicating reduced alpha amylase activity. Farinograph stability measurements indicated that the stability of a bread dough formed with the treated flour of Examples 7, 8 and 9 increased with increasing exhaust temperature.

TABLE 3

| Inlet/Outlet Temp. (°C.) | SAMPLE | | | |
|---|---|---|---|---|
| | CONTROL 3 NA | EX. 7 150°/70° | EX. 8 150°/80° | EX. 9 150°/90° |
| Moisture (wt %) | 13.4 | 5.9 | 4.1 | 3.3 |
| Ash (wt %)* | .35 | .35 | .36 | .35 |
| Protein (wt %)* | 8.55 | 8.7 | 8.6 | 8.6 |
| Falling Number (seconds)* | 377 | — | — | 444 |
| Farinograph | | | | |
| Stability (minutes) | 5.5 | 11.5 | 14.0 | 16.0 |
| Absorption (wt %)* | 51.6 | 49.7 | 48.3 | 48.9 |
| Peak Time (minutes) | 1.5 | 5.5 | 6.0 | 8.0 |
| Mixing Tolerance B.U. | 110.0 | 35.0 | 30.0 | 30.0 |

*Adjusted to 14% moisture basis.

EXAMPLE 10 (TABLE 4)

A quantity of pastry flour similar but not identical to that described above in connection with Examples 7 through 9 was divided into two parts. The control sample was not heat treated, while the other sample was heat treated as Example 10, using natural gas as the heat source. As before the moisture content was substantially reduced, the ash and protein content were little changed when corrected to a moisture basis of 14 percent, and the Falling Number increased. Farinograph stability measurements showed a substantial increase in dough stability, from 4 to 11 minutes. As before, the particle size was not seen to change with heat treatment.

TABLE 4

| Inlet/Outlet Temp. (°C.) | SAMPLE | |
|---|---|---|
| | CONTROL 4 NA | EX. 10 150°/90° |
| Moisture (wt %) | 11.9 | 3.3 |
| Ash (wt %)* | .466 | .472 |
| Protein (wt %)* | 9.6 | 9.3 |
| Falling Number (seconds)* | 462 | 574 |
| Farinograph | | |
| Stability (minutes) | 4.0 | 11.0 |
| Absorption (wt %)* | 51.0 | 50.7 |
| Peak Time (minutes) | 1.5 | 6.5 |
| Mixing Tolerance (B.U.) | 120.0 | 35.0 |

*Corrected to 14% moisture basis.

EXAMPLES 11-13 (TABLE 5)

A quantity of bread flour (100 percent hard red winter wheat) obtained from the Alton, Ill. flour mill of ConAgra, Inc. was divided into four samples. The control sample was not heat treated, while the remaining samples were heat treated as defined in connection with Examples 11, 12 and 13 of Table 5. In all cases natural gas was used for the heat source. Moisture, ash and protein content, and Falling Number followed the patterns described above. Additionally, farinegraph stability measurements showed a substantial increase in dough strength, particularly for Example 13.

The flour used in these samples was not bleached or enriched, and neither malt nor bromate was added.

TABLE 5

| Inlet/Outlet Temp. (°C.) | SAMPLE | | | |
|---|---|---|---|---|
| | CONTROL 5 NA | EX. 11 (150°/70°) | EX. 12 (150°/80°) | EX. 13 (150°/90°) |
| Moisture (wt %) | 13.6 | 6.5 | 5.4 | 4.5 |
| Ash (wt %)* | .46 | .47 | .47 | .46 |
| Protein (wt %)* | 11.7 | 11.8 | 11.7 | 11.7 |
| Falling Number (seconds)* | 477 | — | — | 582 |
| Farinograph | | | | |
| Stability (minutes) | 11.5 | 16.0 | 16.0 | 25.0 |
| Absorption (wt %)* | 61.6 | 62.4 | 62.2 | 62.6 |
| Peak Time (minutes) | 7.0 | 8.5 | 8.5 | 9.0 |
| Mixing Tolerance (B.U.) | 30.0 | 20.0 | 20.0 | 15.0 |

*Corrected to 14% moisture basis

EXAMPLE 14 (TABLE 6)

Another quantity of bread flour similar but not identical to that used for Examples 12 and 13 was divided into two parts, a control and the part used for Example 14. The control was not heat treated, while Example 14 was treated at an inlet temperature of 150° C. and an outlet temperature of 90° C., using natural gas as the heat source. Again, farinegraph stability measurements showed an increase in stability for Example 14 as compared with the control. In this case the increase in stability was less than that measured in Example 13. This is believed to be related to the high stability of Control 6. The heat treatment process described above is generally more effective at increasing farinograph stability of lower stability flours than of higher stability flours.

TABLE 6

| Inlet/Outlet Temp. (°C.) | SAMPLE | |
|---|---|---|
| | CONTROL 6 NA | EX. 14 150°/90° |
| Moisture (wt %) | 13.2 | 4.4 |
| Ash (wt %)* | .446 | .468 |
| Protein (wt %)* | 11.3 | 11.5 |
| Falling Number (seconds)* | 548 | 853 |
| Farinograph | | |
| Stability (minutes) | 43.0 | 45.0 |
| Absorption (%)* | 57.5 | 58.5 |
| Peak Time (minutes) | 14.0 | 17.0 |
| Mixing Tolerance (B.U.) | 15.0 | 15.0 |

*Corrected to 14% moisture basis

EXAMPLE 15 (TABLE 7)

For Example 15 a quantity of durum extra fancy flour (100 percent durum wheat obtained from the Hastings, Minn. mill of ConAgra, Inc.) was divided into two samples. The control sample was not heat treated, while the other sample was heat treated as defined in Table 7 for Example 15 at an inlet temperature of 150° C. and an outlet temperature of 90° C. using natural gas as the heat source. The stability as measured with a farinograph increased substantially for Example 15 as compared with the control. As before the ash and protein content remained substantially constant and the Falling Number increased on a 14 percent moisture basis.

TABLE 7

| Inlet/Outlet Temp (°C.) | SAMPLE | |
|---|---|---|
| | CONTROL 7 NA | EX. 15 150°/90° |
| Moisture (wt %) | 13.4 | 5.5 |
| Ash (wt %)* | .678 | .664 |
| Protein (wt %)* | 12.8 | 12.7 |
| Falling Number (seconds)* | 529 | 664 |
| Farinograph | | |
| Stability (minutes) | 3.0 | 6.0 |
| Absorption (wt %)* | 70.0 | 68.8 |
| Peak Time (minutes) | 3.0 | 4.0 |
| Mixing Tolerance (B.U.) | 85.0 | 35.0 |

*Corrected to 14% moisture basis

EXAMPLES 16–18 (TABLE 8)

Flour similar but not identical to that used in that Example 15 was used for Examples 16 through 18. A sample of this flour was divided into four parts, and the control was not heat treated. Examples 16, 17 and 18 were heat treated at an inlet temperature of 150° C. and outlet temperatures of 70°, 80° and 90° C., respectively, using natural gas as the heat source (Table 8). The moisture ash and protein content followed the pattern described above. Farinograph stability measurements were not obtained for the control, but they showed an increasing stability with increasing exhaust gas temperature for Examples 16, 17 and 18.

TABLE 8

| Inlet/Outlet Temp. (°C.) | SAMPLE | | | |
|---|---|---|---|---|
| | CONTROL 8 NA | EX. 16 150°/70° | EX. 17 150°/80° | EX. 18 150°/90° |
| Moisture (wt %) | 13.9 | 6.9 | 6.3 | 5.4 |
| Ash (wt %)* | .69 | .68 | .68 | .69 |
| Protein (wt %)* | 13.2 | 13.0 | 13.2 | 13.2 |
| Farinograph | | | | |
| Stability (minutes) | 3.0 | 3.0 | 3.5 | 4.0 |
| Absorption (wt %)* | 69.2 | 69.0 | 69.5 | 68.3 |
| Mixing Tolerance (B.U.) | 80.0 | 80.0 | 80.0 | 60.0 |

*Corrected to 14% moisture basis

EXAMPLE 19 (Table 9)

For Example 19a sample of fine whole wheat flour (100 percent spring wheat flour obtained from the Hastings, Minn. mill of ConAgra, Inc.) was divided into two parts. The first part formed the control of Table 9, and the second part was heat treated using natural gas as the heat source with an inlet temperature of 150° C. and an outlet temperature of 90° C. The moisture, ash, and protein content and the Falling Number followed the pattern described above. Also, farinograph stability measurements showed a substantially increased dough stability for Example 19 as compared with the control. Particle size was analyzed and found not to differ substantially between the control and Example 19.

TABLE 9

| Inlet/Outlet Temp. (°C.) | SAMPLE | |
|---|---|---|
| | CONTROL 9 NA | EX. 19 150°/90° |
| Moisture (wt %) | 11.8 | 5.5 |
| Ash (wt %)* | 1.690 | 1.820 |
| Protein (wt %)* | 14.2 | 13.9 |
| Falling Number (seconds)* | 511 | 571 |
| Farinograph | | |
| Stability (minutes) | 8.0 | 17.5 |
| Absorption (wt %)* | 70.0 | 70.2 |
| Peak Time (minutes) | 5.5 | 6.5 |
| Mixing Tolerance (B.U.) | 30.0 | 25.0 |

*Corrected to 14% moisture basis

EXAMPLES 20–21 (Table 10)

For Examples 20 and 21 a high gluten, 100 percent spring wheat flour, identified under the tradename Kyrol and produced in the Hastings, Minn. mill of ConAgra, Inc., was divided into three samples. The control sample was untreated and was analyzed as described in Table 10 at the same time as the treated flours of Examples 20 and 21. Example 20 was treated with the drying apparatus 10, with an inlet temperature of 255° C. and an exhaust temperature of 150° C. Example 21 was treated with an inlet temperature of 300° C. and an exhaust temperature of 175° C. The heat source for this trial was natural gas. The flour was not bleached, enriched or treated with enzymes or bromate.

Table 10 lists the measured moisture, ash and protein content of the flours. The moisture content was substantially reduced for the treated flour of both Examples 20 and 21, and for this reason the ash, protein and Falling Number measurements have been normalized for flour at a 14 percent moisture basis. Note that the ash and protein contents have not varied, but that the Falling Number has increased, due to the inactivation of alpha alylase. Table 10 also shows the results of farinograph measurements on the control flour and the flours of Examples 20 and 21. The farinograph data shows that at the temperatures used in this experiment the gluten quality has been reduced. This is noted in the stability analysis of Example 20. Also note that at the temperatures used in Example 21 a dough could not be produced which displayed any gluten quality.

TABLE 10

| | SAMPLE | | |
|---|---|---|---|
| | CONTROL 10 | EX. 20 | EX. 21 |
| Inlet/Outlet Temp. (°C.) | NA | 255°/150° | 300°/175° |
| Moisture (wt %) | 13.2 | 1.0 | 0.6 |
| Ash (wt %)* | .538 | .565 | .551 |
| Protein (wt %)* | 13.7 | 13.8 | 13.8 |
| Falling Number (seconds)* | 420 | 600 | 1855 |
| Farinograph | | | |
| Stability (minutes) | 11.0 | 7.5 | Did not yield a dough capable of producing a farinograph curve. |
| Absorption (wt %)* | 63.5 | 78.9 | |
| Peak Time (minutes) | 6.0 | 26.0 | |
| Mixing Tolerance (B.U.) | 40 | 40 | |

*Corrected to 14% moisture basis

EXAMPLES 22–24 (Table 10a)

For Examples 22–24, a high gluten, 100% spring wheat flour, identified under the trade name Kyrol and produced in the Hastings, Minn. mill of ConAgra, Inc. (similar but not identical to the flour of Examples 4–6, Control 2, Examples 20–21, and Control 10) was divided into four samples. The control sample was untreated and was analyzed as described in Table 10a at the same time as the treated flours of Examples 22–24. Examples 22–24 were treated with the drying apparatus 10, using inlet and outlet temperatures as indicated in Table 10a. The flour was not bleached, enriched or treated with enzymes or bromate.

Table 10a lists the measured moisture, ash and protein content of the flours. The moisture content was substantially reduced for the treated flours of Examples 22–24, and for this reason the ash, protein and Falling Number measurements have been normalized for flour at a 14 percent moisture basis. Note that the ash and protein contents do not vary significantly, but that the Falling Number has increased with respect to Control 11, due to the inactivation of alpha amylase. Table 10a also shows the results of farinograph measurements on the control flour and the flours of Examples 22–24. The farinograph data show that the gluten quality has been increased in Examples 22 and 23, but reduced in Example 24. Also note that at the temperatures used in Example 24 a dough could not be produced which displayed any gluten quality.

TABLE 10a

| | SAMPLE | | | |
|---|---|---|---|---|
| | CONTROL 11 | EX. 22 | EX. 23 | EX. 24 |
| Inlet/Outlet Temp (°C.) | NA | 220°/125° | 235°/135° | 285°/165° |
| Moisture (wt %) | 12.1 | 2.3 | 1.9 | 0.6 |
| Ash (wt %)* | .548 | .560 | .560 | .594 |
| Protein (wt %)* | 13.5 | 13.5 | 13.4 | 13.8 |
| Falling Number (seconds)* | 410 | 457 | 549 | 913 |
| Farinograph | | | | |
| Stability (minutes) | 13.0 | 47.0 | 43.0 | Did not yield a dough capable of producing a farinograph curve. |
| Absorption (wt %)* | 63.9 | 63.8 | 65.6 | |
| Peak Time (minutes) | 6.5 | 33.5 | 33.0 | |
| Mixing Tolerance (B.U.) | 30 | 10 | 10 | |

TABLE 10a-continued

| | SAMPLE | | | |
|---|---|---|---|---|
| | CONTROL 11 | EX. 22 | EX. 23 | EX. 24 |
| Inlet/Outlet Temp (°C.) | NA | 220°/125° | 235°/135° | 285°/165° |

*Corrected to 14% moisture basis

Figure 6:
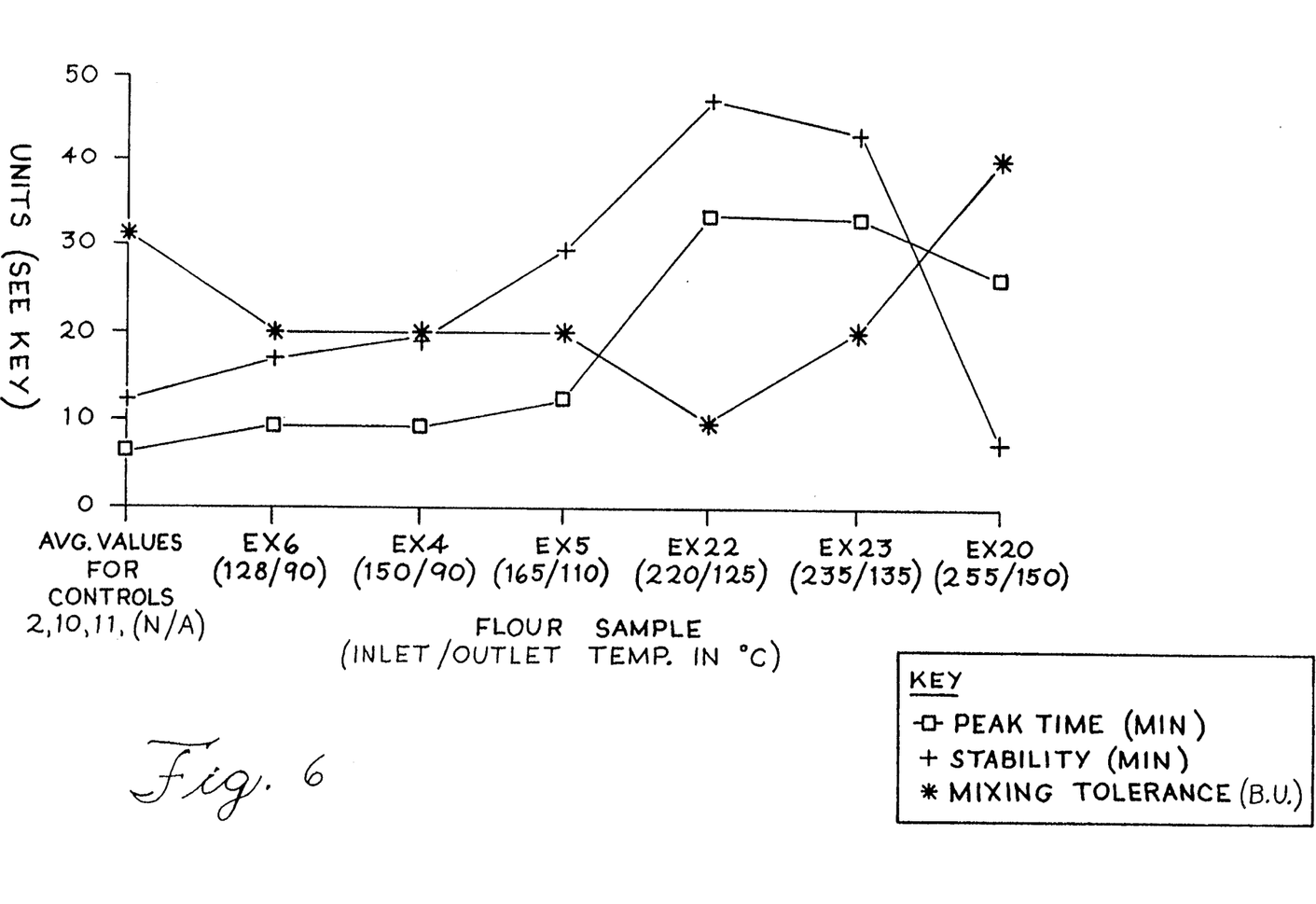
FIG. 6 is a graph of data related to Controls 2, 10 and 11 and Examples 4–6, 20, 22 and 23.

FIG. 6 graphically presents data related to Controls 2, 10 and 11 and Examples 4–6, 20, 22 and 23, which were similar high gluten, 100% spring wheat flours. Note that stability is increased with respect to the average control value for outlet temperatures of 90°, 110°, 125° and 135° C., but that stability is much lower for an outlet temperature of 150° C. than 135° C. Based on the data of FIG. 6, it appears that outlet temperatures up to about 145° C. provide increased stability flours for this type of flour.

Bake Tests

Bake tests were performed to compare the net bake absorption of flours treated with the drying apparatus 10 with control flours. A high gluten, 100 percent hard red spring wheat flour sold under the tradename Kyrol and produced in the Hastings, Minn. mill of ConAgra, Inc. was used for these tests. This flour was a fraction of the control and the flour of Example 5 of Table 2 above. The control was not heat treated. The heat treated sample was heat treated with the drying apparatus 10, with the inlet and outlet temperatures adjusted at 165° C. and 110° C., respectively, and a residence time in the range of 5–8 seconds.

The control and treated flours were used to form sponges using the recipe set out in Table 11a.

TABLE 11a

| SPONGE | GRAMS |
|---|---|
| Std Hard Wheat Bread Flour (ConAgra, Inc.) | 435.00 |
| Vital Wheat Gluten (ConAgra, Inc.) | 90.00 |
| Yeast Food (Fermaloid, ADM Arkady) | 3.75 |
| Dough Conditioner (SSL, ADM Arkady) | 3.75 |
| Dough Conditioner (Elasdo, ADM Arkady) | 5.63 |
| Compressed Baker's Yeast (Red Star) | 22.50 |
| Tap Water | 390.00 |

The following method was used to form the sponges:

All of the ingredients of Table 11A were mixed in a Hobart Model A-120 Mixer using a three-prong mixer for one minute on low speed, followed by one minute on medium speed. The resulting sponge was then placed in a greased dough trough, in a fermentation cabinet (TMCO Mfg. Co. Fermentation Cabinet) for three hours at 86° F. and 82% relative humidity.

These sponges were then used to form loaves, using the recipe set out in Table 11b.

TABLE 11b

| DOUGH | GRAMS |
|---|---|
| Hard Wheat Bread Flour (ConAgra, Inc.) | 225.00 |
| Oat Fiber (Snowite, Canadian Harvest) | 150.00 |
| Salt (Omaha Bakers) | 16.88 |
| Sweet Dairy Whey (Feaster Foods) | 11.25 |
| Calcium Propionate (DuCoa) | 3.75 |
| Ticaloid Gum (Tic Lite, Tic Gums, Inc.) | 2.81 |
| Dough Conditioner (Panadan 123, Grinstead) | 3.75 |
| High Fructose Corn Syrup (Grinstead) | 112.50 |
| Tap Water (100% ABS) | 360.00 |

The following method was used to form the loaves:

The sponges and ingredients of Table 11b were mixed in a Hobart Model A-120 mixer using a three prong mixer for one minute on low speed and five minutes on medium speed. The resulting mixture was held for 35 minutes at 86° F. and 82% relative humidity in a fermentation cabinet (TMCO Mfg. Fermentation Cabinet). The resulting material was weighed and cut into doughs of 540 g. These doughs were allowed to rest (covered) for six minutes on a bench. The doughs were then molded and panned, and the panned doughs were placed in a proof box at 100° F. dry bulb temperature-110° F. wet bulb temperature (TMCO Mfg. Fermentation Cabinet) until the doughs attained a height of ¾ inch over the top of the pan. The proofed doughs were then baked for 18 minutes at 400° F. (TMCO Mfg. Reel Oven Model 16-32SS).

Table 12 sets out the results of the bake tests. Net bake absorption defines the maximum amount of water that can be added to the flour (adjusted to a standard moisture content flour) before the dough becomes too sticky or wet to handle with a conventional mixer.

TABLE 12

| | BAKE RESULTS | | | | |
|---|---|---|---|---|---|
| Sample | Net Bake Abs. (Wt %) | Mix time (minutes) | Dough Comment | Volume (cc) | Bake Score |
| Kyrol-Control (V.W.G. @ 8%) | 100 | 8 | Good | 2525 | 87 |
| Kyrol-Control (V.W.G. @ 4%) | 96 | 6 | Good | 2550 | 83 |
| Kyrol-Treated (V.W.G. @ 8%) | 114 | 9 | Good+ | 2572 | 86 |
| Kyrol-Treated (V.W.G. @ 4%) | 116 | 5 | Good+ | 2500 | 88 |
| Kyrol-Treated (V.W.G. @ 2%) | 107 | 6 | Good+ | 2525 | 89 |
| Bake Standard (V.W.G. @ 12%) | 102 | 6 | Good | 2450 | 90 |

Net bake absorption is expressed in Table 12 as the weight of water added to the flour as a percentage of the combined flour and vital wheat gluten, corrected to a 14 wt % moisture content for the flour.

The Bake Score is an overall rating of each individual loaf of bread as compared with a bake standard (that is predefined as having a bake score of 90).

Note that the control flour was scored at 87 with 8% vital wheat gluten but only at 83 with 4% vital wheat gluten. A bake score of 83 is generally considered unsatisfactory. In contrast, the bake score for the treated flour increased with decreasing amounts of vital wheat gluten. The treated flour with 2% added vital wheat gluten had a bake score of 89, comparable to the bake score of 90 of the bake standard with 12% added vital wheat gluten. This represents a cost advantage, as the cost of vital wheat gluten is significantly higher than that of flour. The increased net bake absorption exhibited by the heat treated flours represents a further cost advantage.

A second bake test was performed using the control and heat treated flours of the preceding bake test to bake Kaiser rolls. A third flour was also used, which was similar to the control flour with added malted barley flour and bromate. The results of this second bake test are set out in Table 13.

TABLE 13

| Sample | Net Bake Abs (Wt %) | Mix Time (min) | Dough Comment | After Bake Volume (cc) | Bake Score |
|---|---|---|---|---|---|
| Untreated Kyrol (Control) | 54 | 3-12 | Strong++ | 350 | 87 |
| Treated Kyrol | 74 | 3-13 | Good | 287.5 | 87 |
| Kyrol Std. Malted & Bromate | 54 | 3-4 | Good | 445 | 90 |

As shown in Table 13, the net bake absorption of the heat treated flour was 10% greater than that of the control flour after accounting for differences in moisture content of the heat treated and control flours. The heat treated flour and the control flour both showed longer mix times and lower volumes as compared to the third flour. These differences are due to the lack of malted barley flour and bromate in the heat treated and control flours.

A third bake test was performed to test the effect of added malted barley flour and bromate. Samples of the control and heat treated flours of the preceding bake test were modified by adding malted barley flour and bromate as additives, and these modified flours were used to make Kaiser rolls as in the preceding bake test. Table 14 sets out the results.

TABLE 14

| Sample | Net Bake Abs (Wt %) | Mix Time (min) | Dough Comment | Volume (cc) | Bake Score |
|---|---|---|---|---|---|
| Untreated Kytrol (Control) + Malt + Bromate | 54 | 3-6 | Good | 425 | 88 |
| Treated Kyrol + Malt + Bromate | 74 | 3-9 | Good | 400 | 88 |

As expected, the bake volume increased and the mix time decreased as compared with comparable measurements of Table 13. In forming the Kaiser rolls, the dough was scaled at 70 g/roll. Starting with an initial flour weight of 1000 g, the control flour of Table 14 produced 23 Kaiser rolls and 50 g of scrap dough, while the heat treated flour of Table 14 produced 26 Kaiser rolls and 50 g of scrap dough. The increased net bake absorption of the heat treated flour increased the yield of rolls obtained from a given weight of flour.

Refrigerated Dough Bake Tests

Bake tests were performed to test the shelf life of refrigerated doughs made with heat treated flours as compared with control flours. Table 15 defines the procedure used in these tests to make pizza shells (Steps 1-5), store at 45° F. for six days (Step 6) and then bake them (Step 7).

TABLE 15

| Pizza (Hand Stretch) | |
|---|---|
| Ingredient | Amount |
| Flour | 200 g. |
| Oil | 4 cc |
| Salt | 4 g. |
| Sugar (Gran) | 4 g. |
| Yeast (Comp) | 6 g. |
| Water (Variable) | 120 cc |

1. Add oil to flour in mixer - mix for three minutes for even disbursement.
2. Add salt and sugar to flour, oil mixture.
3. Dissolve yeast in warm water (105° F.), add to above dry mixture.
4. Mix for three minutes low speed Hobart Model N50 to form a dough.
5. Shape and stretch doughs evenly with hands on a lightly greased 12" pizza pan.
6. Refrigerate 6 days @45° F.
7. Bake at 400° F. for 20 minutes.

Seven flour samples were tested, identified as Samples 1-7 in Table 16.

TABLE 16

| Sample | Flour Type | Heat Treatment Conditions (inlet/outlet temp (°C.)) | Additives | Added Water (cc) | Dough Comments After Step 4 (shape & stretch) |
|---|---|---|---|---|---|
| 1 | Kyrol (hard red spring wheat) | N/A | .1% malted barley flour | 180 | Good |
| 2 | Kyrol (hard red spring (wheat) | N/A | — | 180 | Good |
| 3 | Kyrol (hard red spring wheat) | 150°/90° | — | 200 | Good, Strong |
| 4 | Buccaneer (hard red winter wheat) | 150°/90° | — | 195 | Good, Strong |
| 5 | Buccaneer (hard red winter wheat) | N/A | — | 180 | Good |
| 6 | Pastry Flour | N/A | — | 150 | Good |
| 7 | Pastry Flour | 150°/90° | — | 170 | Good, Dry |

The seven samples were then tested for dough properties after the refrigerated storage Step 5, with the following results (Table 17).

TABLE 17

| Sample | Dough Comments |
|---|---|
| 1 | Very sticky, loose, tacky, stringy surface |
| 2 | Sticky, slightly tacky, stringy surface |
| 3 | Not sticky, smooth surface |
| 4 | Not sticky, smooth surface |
| 5 | Sticky, stringy surface, tacky |
| 6 | Very very sticky and loose, ran over pan, unable to bake |
| 7 | Smooth surface, dry, not sticky |

Note that the heat treated flours (Samples 3, 4 and 7) were rated as superior to the respective controls (Samples 2, 5 and 6). The samples were then baked without toppings (Step 7) and the baked crusts were described as set out in Table 18:

TABLE 18

| Sample | Crust Comments |
|---|---|
| 1 | Uneven surface, large bubbles, open texture, bare spots - pan shows, sticks to pan |
| 2 | Uneven surface, large bubbles, open texture, sticks to pan |
| 3 | Smooth even surface, good internal texture, does not stick to pan |
| 4 | smooth even surface, good internal texture, does not stick to pan |
| 5 | Uneven surface, sticks to pan |
| 6 | could not bake |
| 7 | Smooth surface, tight internal texture Light crust color, did not stick to pan |

Table 18 confirms that the heat treated flours produced pizza dough with an increased refrigerated shelf life as compared with the control flours.

The foregoing examples illustrate the manner in which flour may be heat treated in accordance with this invention to increase farinograph stability, net bake absorption, and refrigerated shelf life of dough made from the heat treated flour. This invention allows low protein - low strength hard wheat flours, and even some soft wheat flours, to be used in bread baking, and it increases the baking yield.

The examples set out above are intended to illustrate but not to limit the scope of this invention, which is defined by the following claims, including all equivalents.

We claim:

1. A method for increasing stability of a bread baking wheat flour comprising the following steps:
   (a) providing a quantity of a bread baking wheat flour;
   (b) drying the flour by suspending the flour in a heated carrier gas having an outlet temperature in the range of about 70-145 degrees C. for a time less than about one minute sufficient to reduce moisture content of the flour to less than about 8 wt % and to increase farinograph stability of the flour by at least 20%, both as compared with the flour provided in step (a);
   (c) separating the flour from the carrier gas to provide a free flowing dry powder having a reduced moisture content and an increased farinograph stability as compared with the flour provided in step (a).

2. The method of claim 1 wherein the outlet temperature is in the range of about 80-100 degrees C.

3. The method of claim 1 wherein the time is less than 30 seconds.

4. The method of claim 1 wherein the time is less than 10 seconds.

5. The method of claim 1 wherein the flour provided in step (a) has an initial moisture content in the range of 11 to 16 wt %.

6. The method of claim 5 wherein the time and temperature of step (b) are selected to reduce the initial moisture content of the flour to less than about 7 wt %.

7. The method of claim 1 wherein the time and temperature of step (b) are selected to reduce alpha amylase activity of the flour.

8. The method of claim 1 wherein the flour of step (a) is selected from the group consisting of hard wheat flour, soft wheat flour, and mixtures thereof.

9. The increased stability wheat flour produced by the process of claim 1.

10. A method for making an increased stability wheat flour bread dough comprising the following steps:
 (a) providing a quantity of a bread baking wheat flour;
 (b) drying the flour by suspending the flour in a heated carrier gas having an outlet temperature in the range of about 70–145 degrees C. for a time sufficient to reduce moisture content of the flour to less than about 8 wt % and to increase farinograph stability of the flour by at least 20%, both as compared with the flour provided in step (a);
 (c) separating the flour from the carrier gas to provide a free flowing dry powder having a reduced moisture content and an increased farinograph stability as compared with the flour provided in step (a); and
 (d) mixing at least a portion of the dry powder of step (c) with dough forming ingredients comprising water to form an increased stability bread dough.

11. The method of claim 10 wherein the outlet temperature is in the range of about 80–100 degrees C.

12. The method of claim 10 wherein the time is less than 30 seconds.

13. The method of claim 10 wherein the time is less than 10 seconds.

14. The method of claim 10 wherein the flour provided in step (a) has an initial moisture content in the range of 11 to 16 wt %.

15. The method of claim 14 wherein the time and temperature of step (b) are selected to reduce the initial moisture content of the flour to less than about 7 wt %.

16. The method of claim 15 further comprising the step of (e) refrigerating the dough formed in step (d).

17. The method of claim 10 wherein the time and temperature of step (b) are selected to reduce alpha amylase activity of the flour.

18. The method of claim 10 wherein the flour of step (a) is selected from the group consisting of hard wheat flour, soft wheat flour, and mixtures thereof.

19. The method of claim 10 further comprising the step of (e) refrigerating the dough formed in step (d).

20. The method of claim 19 further comprising the steps of (f) maintaining the refrigerated dough in a refrigerated state for a time period of at least one week; and then (g) baking the stored, refrigerated dough.

21. The increased stability wheat flour dough produced by the process of claim 10.

22. The method of claim 10 wherein the time is less than about one minute.

* * * * *